May 13, 1958 P. REKETTYE 2,834,051
MOLD CHARGING MECHANISM
Filed Sept. 14, 1955 8 Sheets-Sheet 2

*INVENTOR.*
PAUL REKETTYE
BY Ely, Frye &
Hamilton
ATTORNEYS

May 13, 1958   P. REKETTYE   2,834,051
MOLD CHARGING MECHANISM
Filed Sept. 14, 1955   8 Sheets-Sheet 3

INVENTOR.
PAUL REKETTYE
BY Ely, Faye & Hamilton
ATTORNEYS

May 13, 1958   P. REKETTYE   2,834,051
MOLD CHARGING MECHANISM
Filed Sept. 14, 1955   8 Sheets-Sheet 6

FIG. 14

INVENTOR.
PAUL REKETTYE
BY Ely, Frye &
Hamilton
ATTORNEYS

United States Patent Office 2,834,051
Patented May 13, 1958

2,834,051

MOLD CHARGING MECHANISM

Paul Rekettye, Akron, Ohio, assignor to The Sun Rubber Company, Barberton, Ohio, a corporation of Ohio Application September 14, 1955, Serial No. 534,316

9 Claims. (Cl. 18—30)

This invention relates generally to machines for rotationally casting hollow articles from plastic materials, such as plastisols, in non-porous molds, and more particularly to improved mechanism for depositing a measured charge of liquid material in a plurality of mold cavities simultaneously when the molds are opened.

The type of casting machine with which this charging mechanism is primarily intended to be used is disclosed in the pending application of myself and Harold G. Bailey, Serial No. 447,789, filed August 4, 1954. Said machine has a turntable carrying a plurality of circumferentially arranged molds which are progressively advanced through charging, unloading and preheating stations, between which the molds are constantly rotated upon two divergent axes during preheating and curing operations.

The turntable of said machine is rotated intermittently so that each successive mold unit is stopped at a charging station and means are provided to stop the molds in horizontal position to facilitate filling them with liquid material. After a mold is charged and closed, the turntable is rotatively indexed to bring the next successive mold to the charging station, and the charged mold is rotated on two divergent axes while passing through a heating zone to distribute the plastisol evenly over the inner surfaces of the molds and progressively cause it to gel and cure.

Preferably, each mold unit comprises two parallel banks of molds which are stopped at the charging station in horizontal position, and also in proper rotational position on their vertical axes, and the mold halves are then moved apart or separated vertically by suitable mold opening mechanism. The charging mechanism includes a plurality of nozzles, one for each mold cavity, which are moved in between the molds with the nozzles in registry with the cavities, and piston means to discharge a measured quantity of liquid through the nozzles into each cavity.

It is highly desirable that each bank of molds may include differently shaped cavities requiring different measured amounts of liquid, and it is an object of this invention to provide improved means whereby the amount charged into each individual cavity may be easily regulated to suit mold cavities having different capacities.

Another object is to provide for supplying fluids of different compositions or color to different groups of mold cavities so that articles of different character or color may be formed simultaneously in the same bank of molds.

Further objects include the provision of improved gravity means for maintaining a constant level reservoir of liquid for supplying a plurality of mold cavities.

Another object is to provide novel means for preventing dripping of the fluid at the discharge nozzles.

A still further object is to provide improved means for positioning the nozzles in close proximity with the registering mold cavities prior to discharging fluid from the nozzles.

The improved mechanism for accomplishing these objects in its preferred embodiment comprises a charging reservoir having several compartments with gravity supply tanks connected to each compartment and a plurality of charging cylinders, one for each mold cavity, in and communicating with the reservoir, there being a nozzle head movable into registry with the mold cavities and mounting nozzles having flexible connections with said charging cylinders, and individual adjustable means for making a lost motion connection between a reciprocating head and a piston in each of said charging cylinders whereby the movement of each piston may be varied in response to the stroke of the head.

Referring to the drawings.

Figure 1:
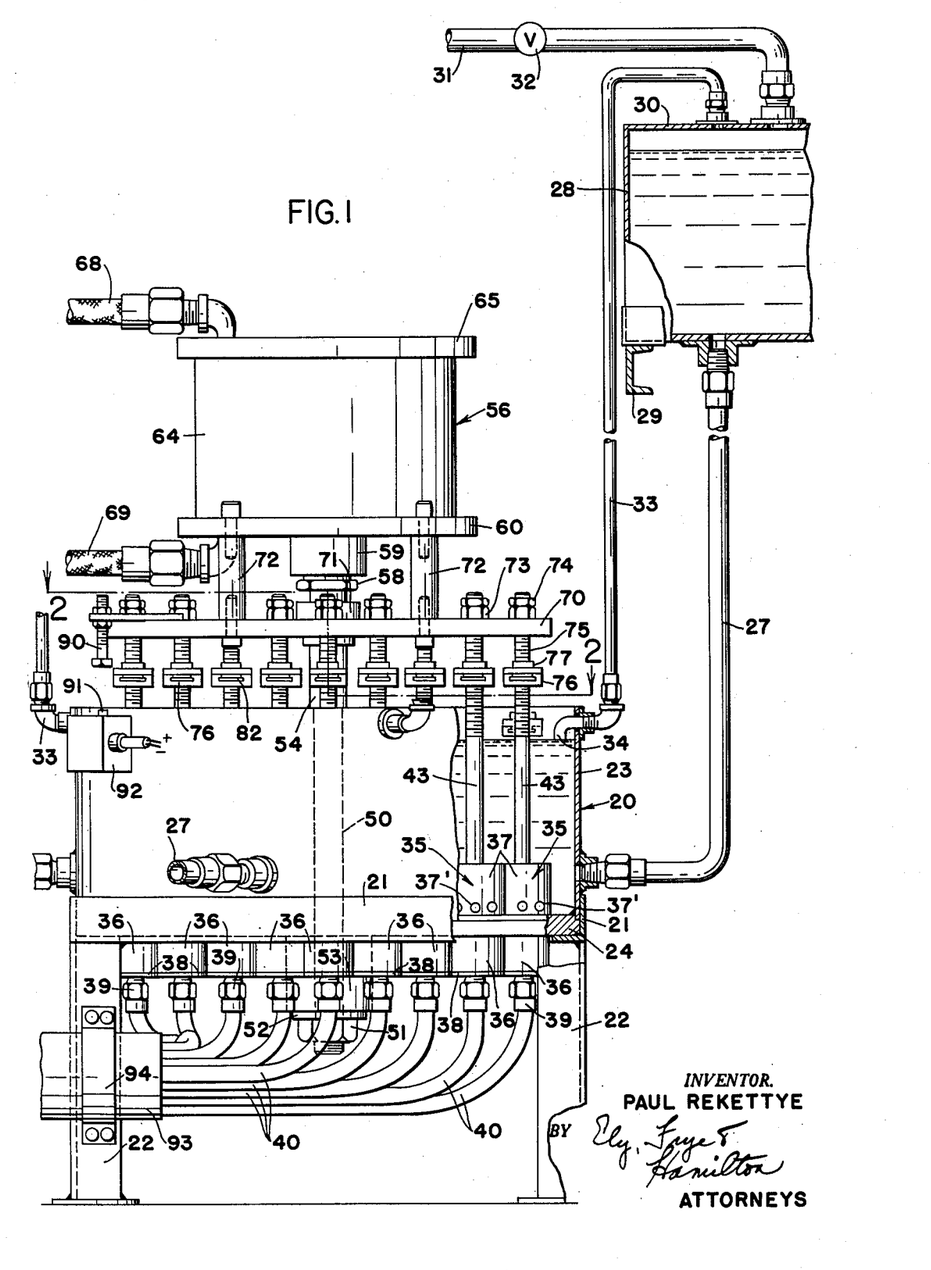
Fig. 1 is a fragmentary side elevation, partly in section, of the improved charging mechanism, the movable nozzle head being omitted.
Figure 2:
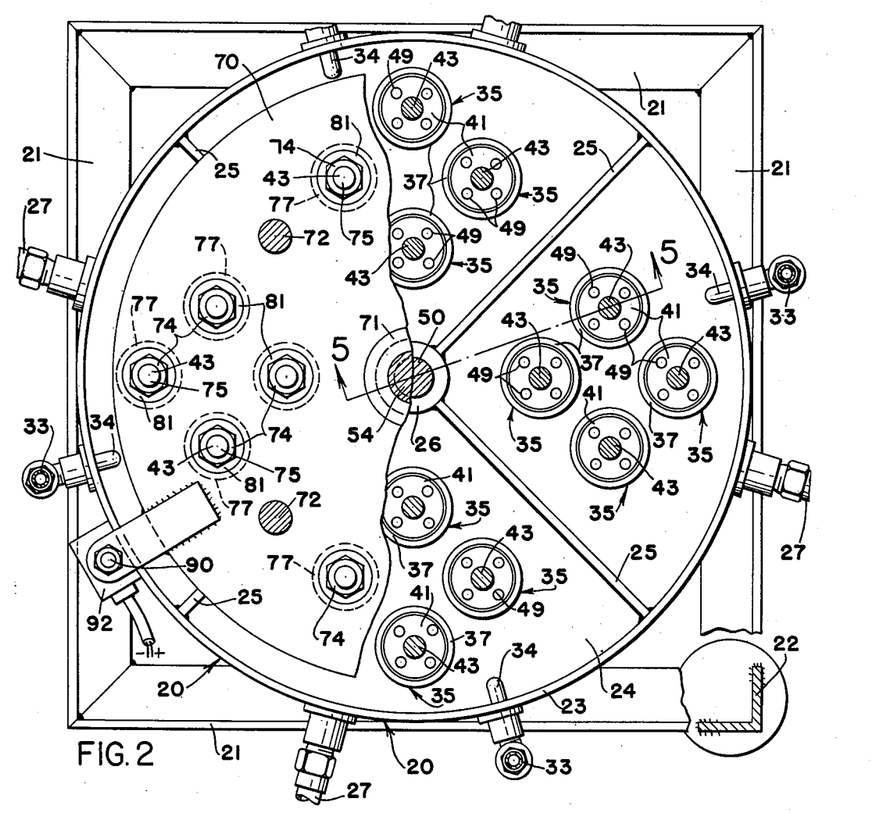
Fig. 2 is a plan view on line 2—2, Fig. 1.
Figure 3:
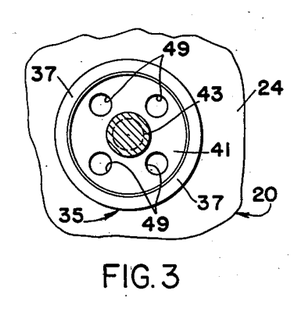
Fig. 3 is an enlarged plan section on line 3—3 of Fig. 5.
Figure 4:
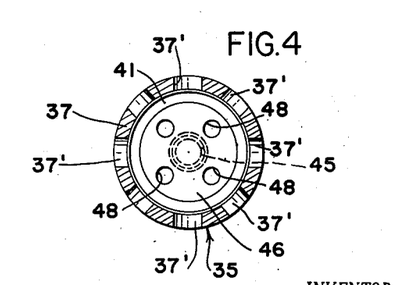
Fig. 4 is an enlarged bottom plan view on line 4—4 of Fig. 5.

Referring first to Figs. 1 and 2, the charging device preferably includes a tank or reservoir for the liquid plastisol or other material which is to be charged into the mold cavities and then rotationally cast. This tank is preferably cylindrical and is indicated at 20, being supported on a rectangular framework comprising horizontal angles 21 and vertical angle legs 22 resting on a suitable supporting surface. The tank 20 has a cylindrical side wall 23 and a flat bottom wall 24 of increased thickness.

Preferably, the tank 20 is divided into several compartments by radial partition walls 25 extending radially inward from the wall 23 to the center tubular hub 26. In the drawing four partition walls 25 are shown dividing the tank into four equal compartments or quadrants. The number of the compartments may be varied, and the sizes made unequal, if desired, within the scope of the invention.

The quadrant compartments are connected by conduits 27 to four supply tanks 28, only one of which is shown as they all may be identical in size and shape. The tanks 28 are supported at a level well above the tank 20 on suitable beams 29, and a conduit 27 connects the bottom of the supply tank 28 with the lower portion of one of the quadrant compartments in tank 20. The top of tank 28 is closed off from the atmosphere by a cover plate 30, and a supply line 31 having a control valve 32 is connected to the top of the tank. A constant level tube 33 has its upper end connected into the top of tank 28 through cover plate 30 and its lower end 34 terminates within and near the top of open tank 20.

When liquid is drawn from tank 20 to drop the liquid level below end 34 of tube 33, the tube connects the closed space above the liquid level in tank 28 with the atmosphere, and the hydrostatic head in tank 28 forces the liquid in tank 28 through tube 27 and into tank 20 until the liquid level therein closes tube end 34 and closes off atmospheric pressure to the upper tank. When this occurs the liquid in the upper tank will continue to flow only for a short period of time until the diminishing p. s. i. therein plus the hydrostatic head of the upper liquid is balanced by the atmospheric pressure on the liquid in the lower tank, which stops the flow from the upper tank to the lower tank.

A plurality of measuring cylinders 35, one for each nozzle, are mounted in the bottom wall 24 of tank 20. As indicated in Fig. 2, there may be four cylinders 35 in each quadrant compartment, making a total of sixteen cylinders. Each set of four cylinders may accordingly supply a different color or composition of liquid to four mold cavities, which may be different in size and shape. Obviously, the number of cylinders in each compartment may be varied. The cylinders 35 are all identical and only one need be described.

Figures 7, 8, 9, 10, 11, 12:
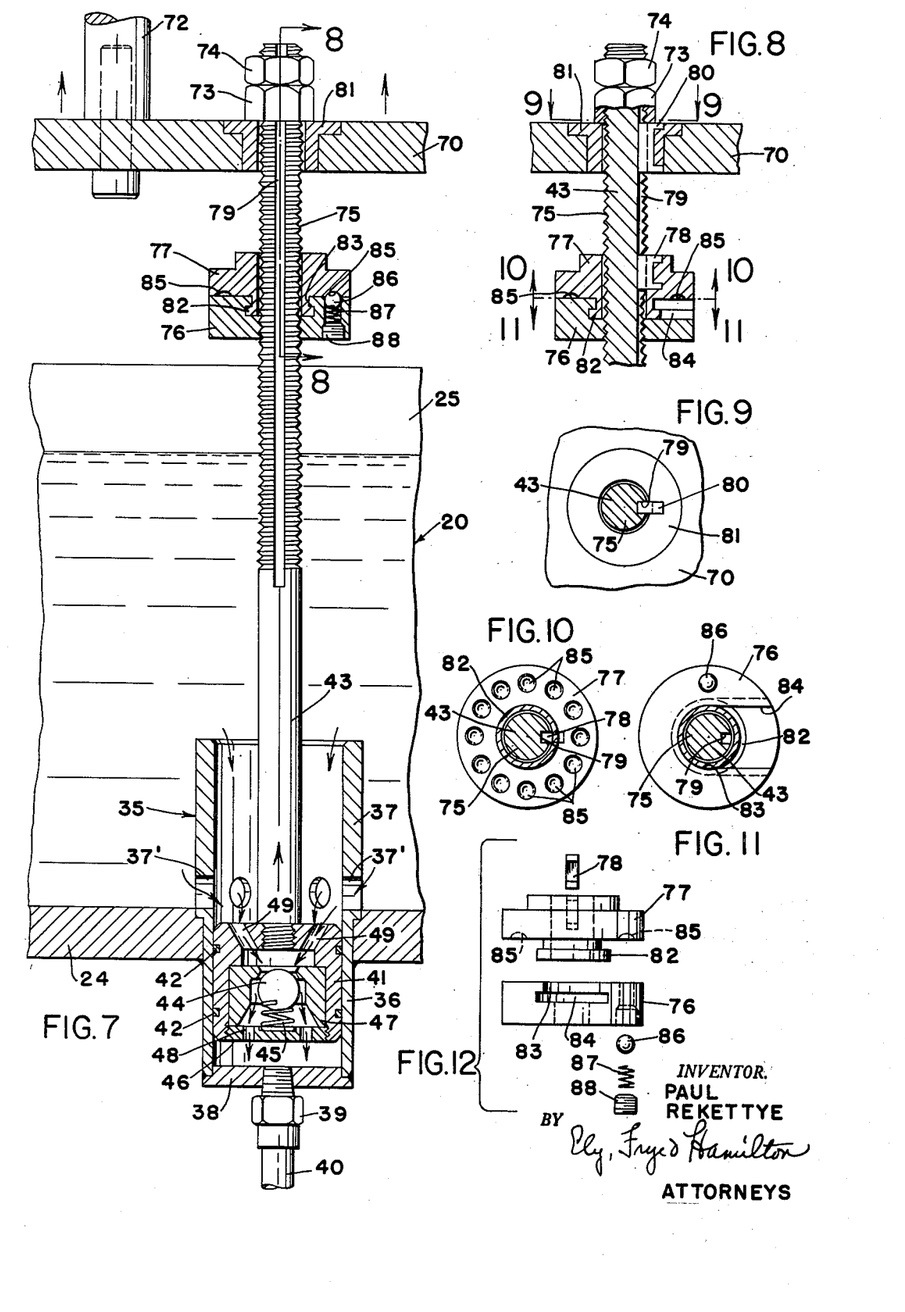
Fig. 7 is an enlarged fragmentary sectional view similar to Fig. 5, showing the piston at a position during the return or up stroke.
Fig. 8 is a fragmentary sectional view on line 8—8, Fig. 7.
Fig. 9 is a plan sectional view on line 9—9 of Fig. 8.
Fig. 10 is a bottom plan view on line 10—10 of Fig. 8.
Fig. 11 is a plan sectional view on line 11—11 of Fig. 8.
Fig. 12 is an exploded view of the parts of the lost motion connection means shown in Figs. 7–11.

As best seen in Fig. 7, each cylinder 35 preferably includes a cylindrical wall portion 36 extending below bottom wall 24 and a wall portion 37 extending above the same. Wall portion 36 has its bottom end closed by a wall 38 through which a hose fitting 39 is screwed, and wall portion 37 has a plurality of lateral holes 37' at the top surface of the tank bottom wall 24. A flexible hose 40 is connected to the fitting 39 for conducting fluid to a nozzle to be described.

A piston 41 is mounted for vertical reciprocation in each cylinder 35, and the extent of movement of the piston controls or measures the amount of liquid forced through the hose 40 to its nozzle. Each piston preferably has sealing rings 42 around its outer periphery, and a piston rod 43 connected to its upper end and extending upwardly through the tank 20. A ball check valve 44 seats on an internal seat on the downstroke of the piston, and opens on the upstroke against a coil spring 45 abutting the bottom retainer plate 46 screwed into the piston.

The plate 46 holds an annular insert 47 in the piston, on which the ball seat is formed. Holes 48 in the plate 46 communicate with holes 49 in the upper wall of the piston to form a passage through the piston when the ball valve is open. Thus, as the piston moves upwardly from the position of Fig. 6 to the position of Fig. 5, a partial vacuum is created below the piston, and fluid from the tank 20 flows through the piston 41 into the bottom cylinder portion 36 below the piston. This partial vacuum is utilized to prevent drip at the nozzle, in a manner to be described, and when the piston has reached the top of its stroke the spring closes the ball valve, and the liquid below the piston is retained within the cylinder 36 and hose 40 by a suitable valve in the nozzle.

Figure 5:
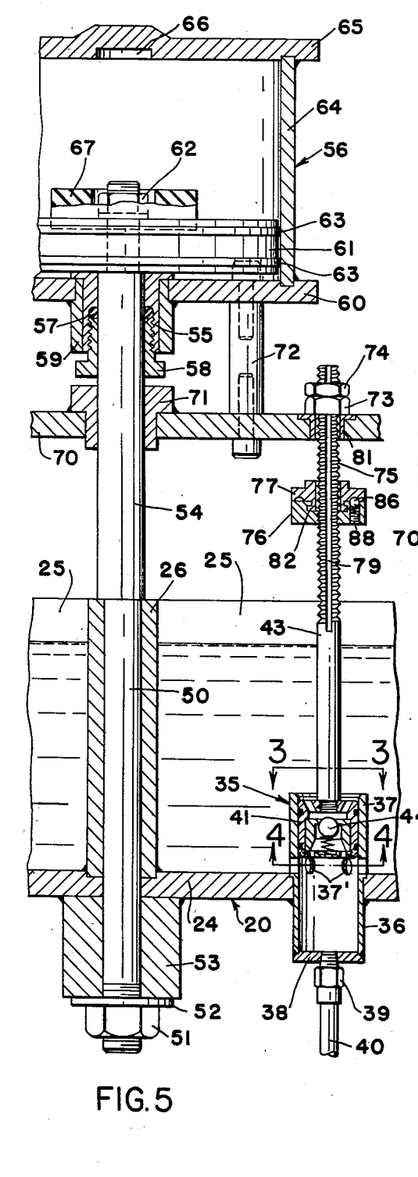
Fig. 5 is an enlarged vertical sectional view, as on line 5—5 of Fig. 2, showing the reciprocating head and one of the pistons connected thereto at the upper end of the stroke.
Figure 6:
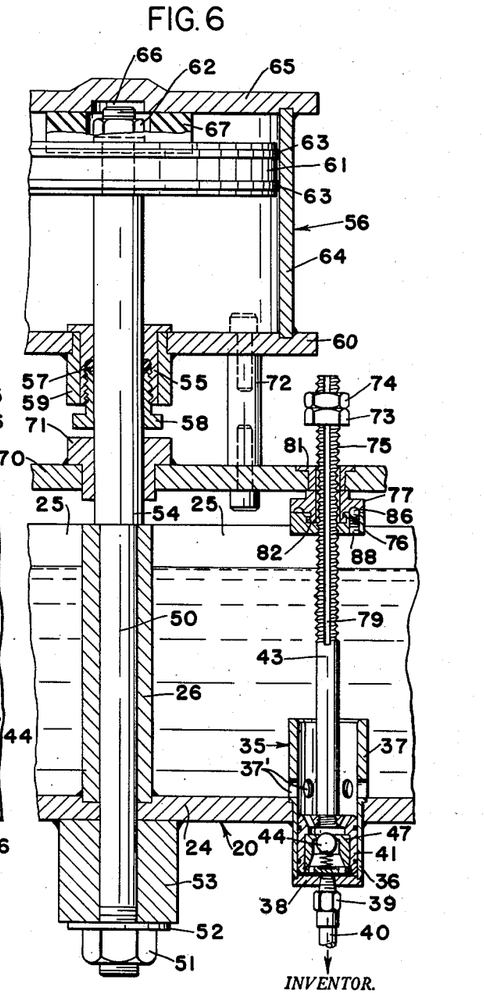
Fig. 6 is a similar view showing the head and one piston at the lower end of the stroke.

As shown in Fig. 5, the piston 41 is at the top of its stroke with its bottom surface just above the lateral ports 37' in cylinder 37. If the piston is moved downward through a full stroke, its lowermost position is at the bottom of cylinder portion 36 as shown in Fig. 6, in which case the full content of the cylinder 36 below ports 37' is delivered to the hose 40 and thence to the nozzle connected thereto. This full content is calculated to be the maximum measured quantity of liquid required for the largest size mold cavity to be filled. When the piston 41 moves downward a shorter stroke a lesser amount of the liquid will be delivered.

The mechanism for operating the pistons 41 and for adjusting their individual strokes will now be described. A stationary piston rod 50 is mounted in the tubular hub 26 of cylinder 20, and has a nut 51 and washer 52 on its lower end abutting a block 53 secured on the underside of the cylinder. A shouldered portion 54 of the rod abuts the upper end of hub 26, and extends slidably through a bushing 55 in the bottom of a hydraulic operating cylinder 56. A sealing ring 57 around the rod 50 is held under compression within the bushing 55 by a jamb nut 58, and the bushing is mounted within a sleeve 59 secured in the bottom wall 60 of the operating cylinder 56. An annular flange on the upper end of the bushing 55 abuts the upper surface of the bottom wall.

A piston 61 is secured on the upper end of rod portion 54 by a nut 62 and sealing rings 63 on the piston slidably engage the wall 64 of the cylinder 56. The top wall 65 of cylinder 56 may have a recess 66 for receiving the upper end of the rod 50, and the nut 62 is preferably surrounded by an annular bumper plate 67 for abutting top wall 65. Pressure fluid is supplied and discharged to and from the ends of cylinder 56 by fluid lines 68 and 69 respectively, for moving cylinder 56 up and down on portion 54 of stationary piston rod 50.

A reciprocating head or plate 70 is slidably mounted on rod portion 54 by means of a central bushing 71 in the plate, and plate 70 is connected in spaced relation to cylinder 56 by spacer studs 72 secured at their ends to plate 70 and cylinder bottom wall 60, respectively. The individual piston rods 43 extend slidably through plate 70 and have stop nuts 73 and lock nuts 74 on their upper ends. Thus, when fluid is introduced through line 68 into the top of cylinder 56 the plate 70 will rise with cylinder 56 and the abutment of the plate with the stop nuts 73 will raise the individual pistons to the positions shown in Fig. 5. The upward movement of cylinder 56 may be limited by abutment of the top flange of bushing 55 with piston 61, or if desired an annular bumper plate similar to bumper 67 may be provided between the piston 61 and bottom wall 60.

Referring to Figs. 7–12, the means for adjusting the strokes of the individual pistons 41 preferably includes an adjusting nut unit on the upper threaded portion 75 of each piston rod 43. These nut units preferably comprise a lower nut portion 76 screwed on the rod and an upper ratchet portion 77 splined or keyed on the rod. Preferably, a key 78 in the member 77 is slidable in a keyway 79 in the upper end of the rod, and a key 80 in surrounding bushing 81 in plate 70 slidably engages keyway 79 and prevents rotation of the rod in said plate. Ratchet member 77 has a depending annular flanged portion 82 which fits in an annularly grooved recess 83 in nut 76 to allow relative rotation of members 76 and 77, and the recess 83 is open laterally outward through a slot 84 for assembly purposes.

In order to yieldingly resist relative rotation between the nut member 76 and ratchet member 77, the under surface of member 77 is provided with a circular series of indentations 85 for selectively receiving a ball 86 in member 76, urged upwardly by a spring 87 backed up by a plug 88, screwed in member 76. Thus, rotation of unit member 76 relative to ratchet member 77 will adjust the vertical position of the nut unit on the rod 75 and hence vary the stroke of the piston 41 on the lower end of the rod, depending upon the amount of lost motion of the plate 70 downwardly before it abuts the ratchet member 77 of the nut unit.

The circumferential distance between adjacent indentations 85 may be calibrated in relation to the amount of liquid in the cylinder 36 so that indexing the ball 86 from one indentation to another will vary the stroke of the piston to change the amount of liquid discharged by a small predetermined fraction. As the nut unit is lowered on the rod the amount of lost motion between the unit and plate 70 is increased and the length of downstroke of the piston 41 is decreased, while raising the nut unit increases the downstroke and increases the amount of liquid discharged. By lowering the nut unit to the bottom of threaded portion 75, as shown in chain lines in Fig. 1, the piston 41 may be rendered inoperative because the plate 70 never engages the nut unit. In this way, any number of the pistons 41 may be adjusted to inoperative position to meet certain requirements.

Referring to Fig. 1, all of the nut units are shown at the same height, but they may be individually adjusted anywhere between a high position, to discharge a maximum amount of liquid material into a nozzle hose 40, and a low position where no liquid is discharged. An adjustable switch actuator bolt 90 is preferably mounted on plate 70 to contact the actuator button 91 of a micro switch 92 on cylinder 20 when the plate 70 reaches the bottom of its stroke. Switch 92 controls a suitable reversing valve (not shown) for reversing the flow through lines 68 and 69 to raise the cylinder 56.

Figure 13:
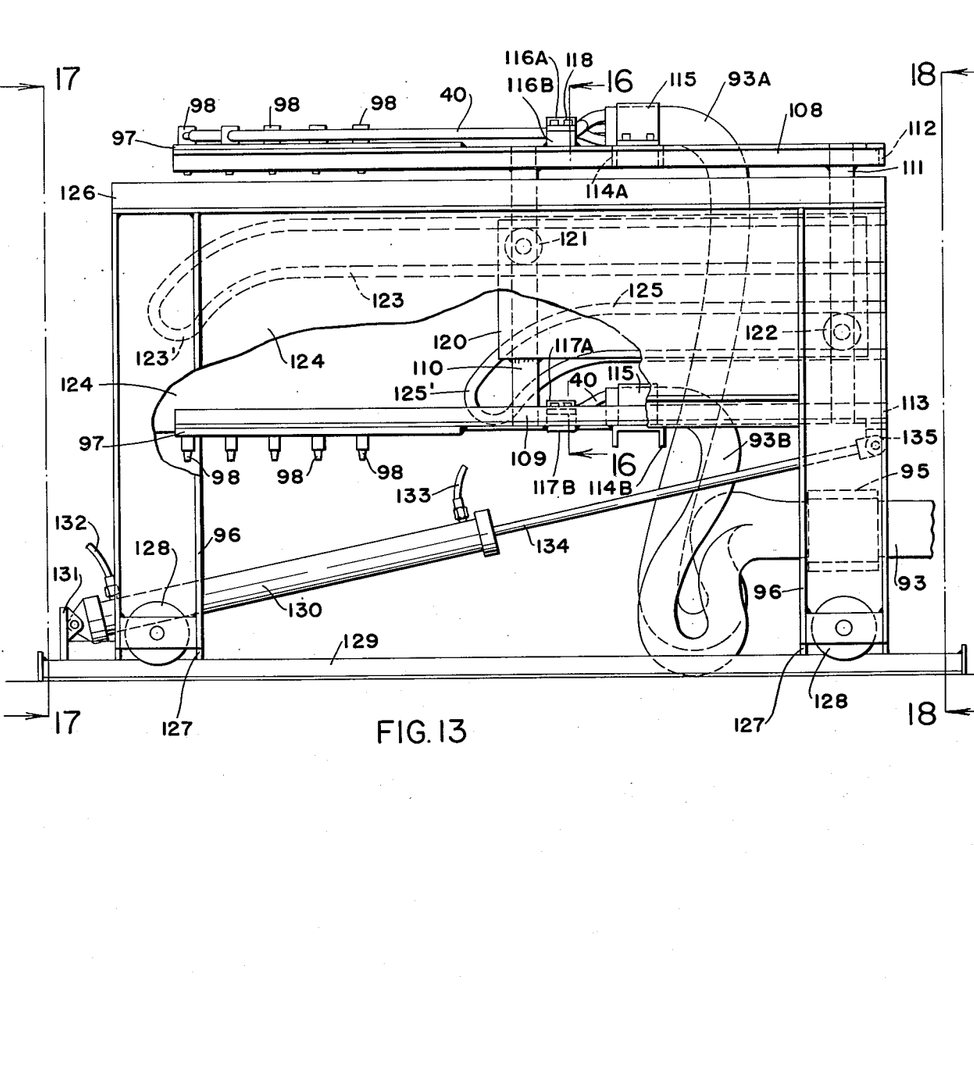
Fig. 13 is a side elevation, partly broken away, of two movable nozzle heads which are connected by flexible hoses to the several pistons of the charging device, the nozzle heads being shown in retracted position.
Figure 14:
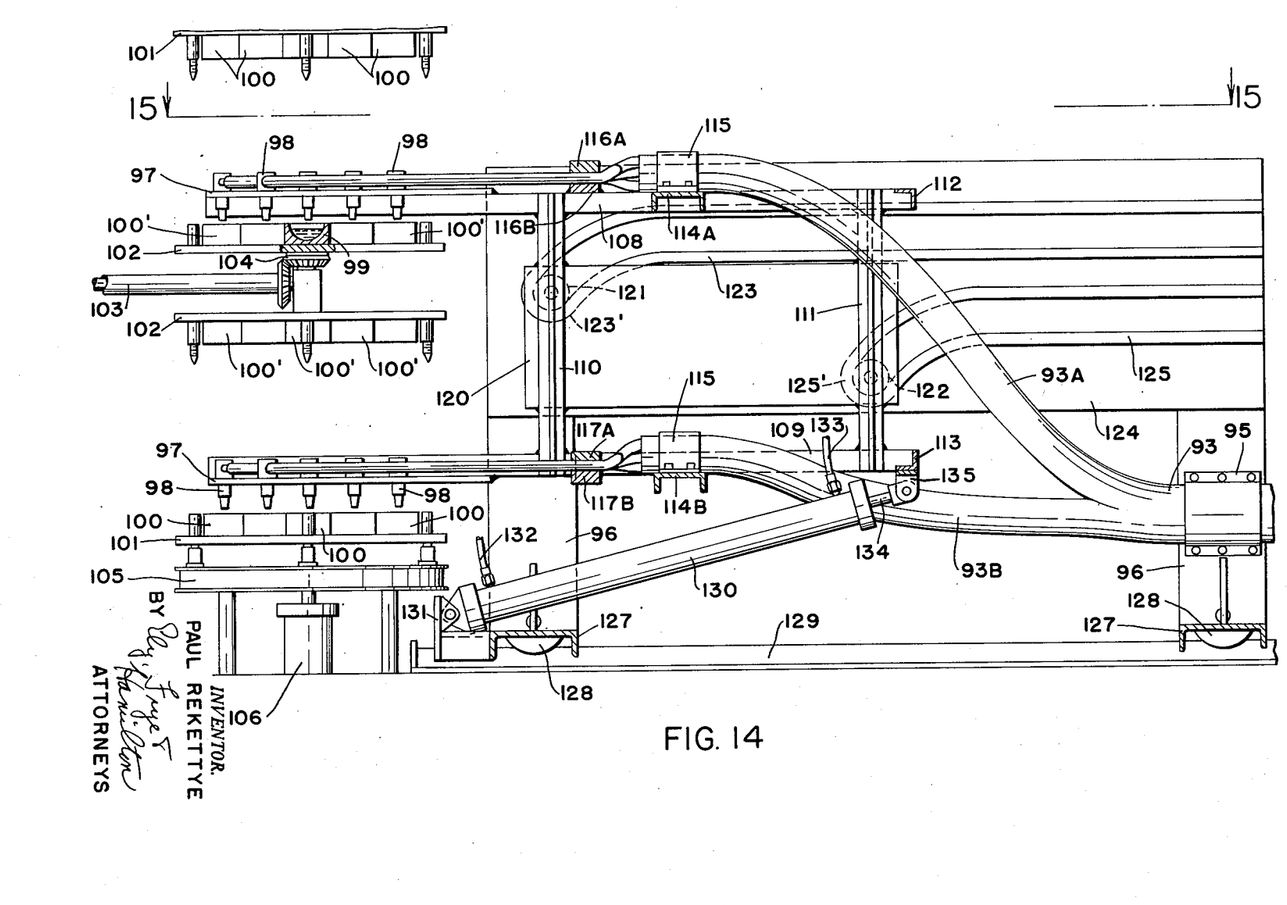
Fig. 14 is a vertical sectional view, showing the nozzle heads in extended position.

Referring now to Figs. 13–18, the nozzle head and mechanism for moving it into registry with the mold cavities will now be described. As seen in Fig. 1, the flexible hoses 40 conducting liquid material from the charging cylinders may all enter a single large conduit 93 having one end mounted by a clamp 94 on a leg 22 of the framework supporting tank 20. As shown in Figs. 13 and 14, the other end of conduit 93 is mounted by a clamp 95 on one of the legs 96 of a frame in which the nozzle head is movably mounted.

As previously stated, each mold unit on the turntable casting machine of application Serial No. 447,789 preferably comprises two parallel banks of molds which are stopped in horizontal position and in proper rotational position around their vertical axes, one above the other, at the charging station, and the mold halves are then moved apart by suitable mold opening mechanism. Accordingly, two nozzle heads are mounted one above the other in a carriage, at the proper levels to move between the two pairs of mold halves when they are opened.

Figures 15, 16:
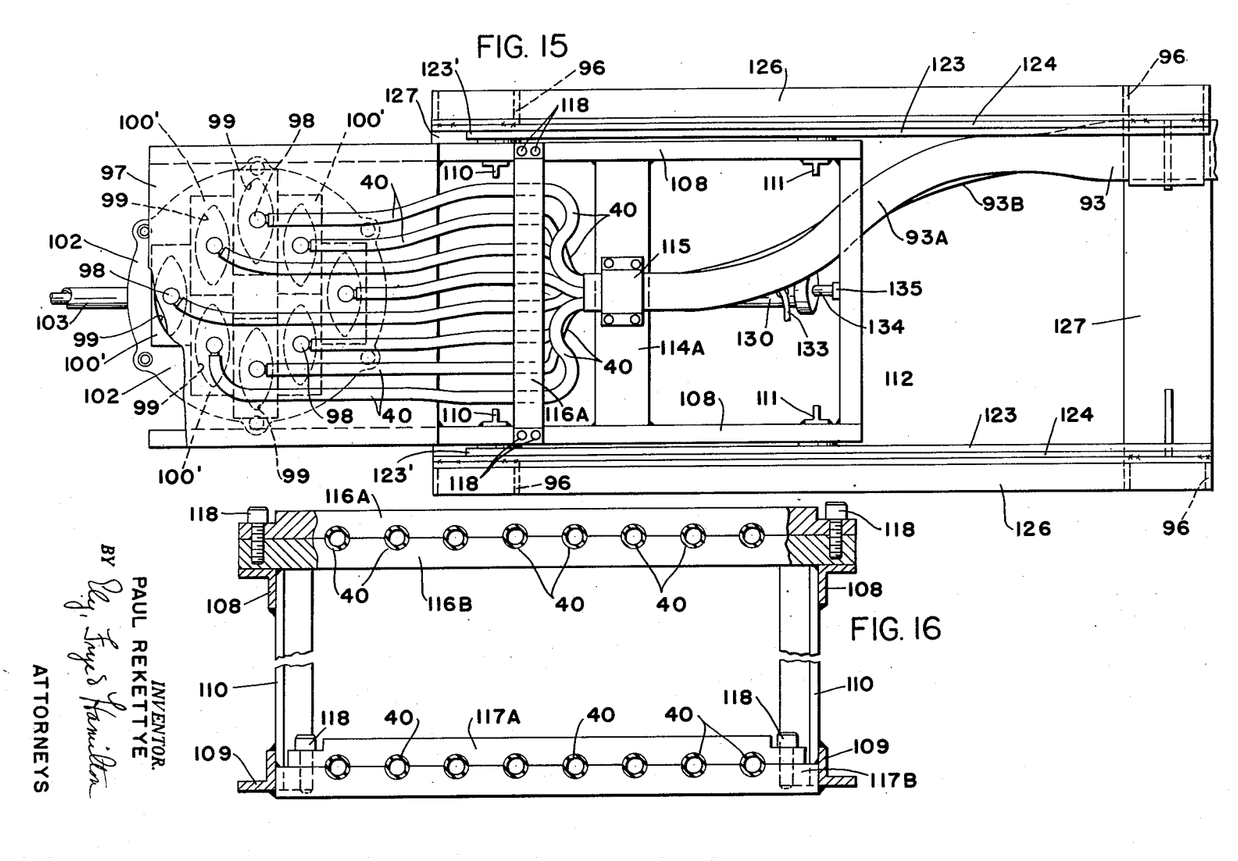
Fig. 15 is a plan view thereof, as on line 15—15 of Fig. 14.
Fig. 16 is a cross sectional view on line 16—16 of Fig. 13.
Figure 17:
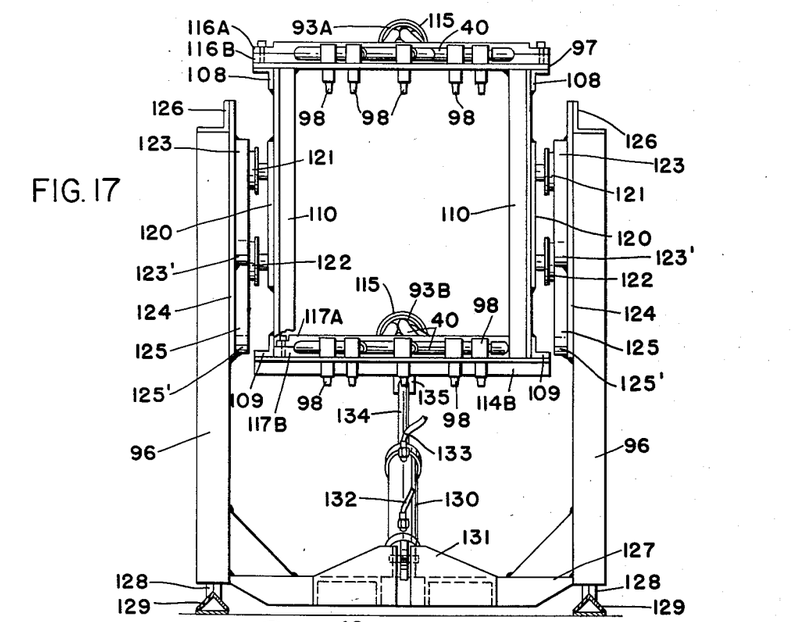
Fig. 17 is an end elevation on line 17—17 of Fig. 13.
Figure 18:
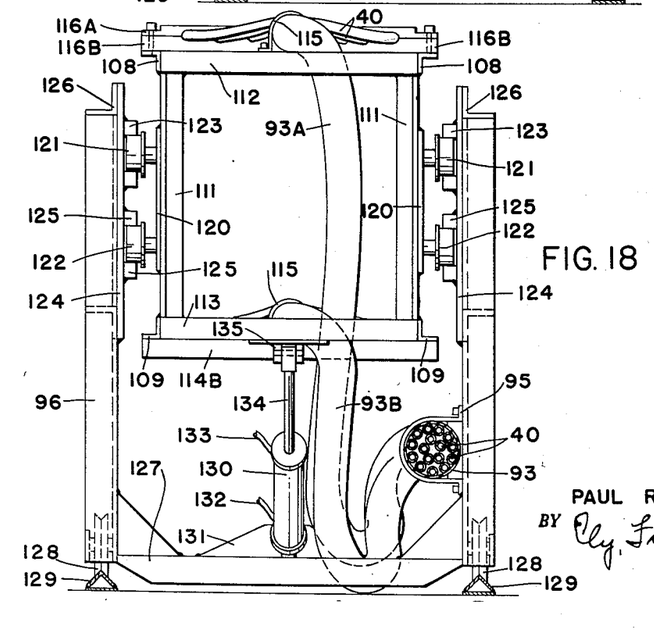
Fig. 18 is an end elevation in the opposite direction, taken on line 18—18 of Fig. 13.

Each nozzle head comprises a plate 97 in which a plurality of downwardly directed nozzles 98 are mounted. As shown in Fig. 15 there may be eight nozzles in each plate for filling eight mold cavities 99 in each bank of molds, making a total of sixteen nozzles connected by the flexible hoses 40 to the charging cylinders 35. The sixteen hoses 40 may be directed from conduit 93 into two branch conduits 93A and 93B, each carrying eight hoses to a nozzle head 97. The several mold sections 100 are illustrated as having cavities 99 for forming toy footballs, but it will be understood that molds for forming other articles may be used, and that a variety of molds may be used for forming several different articles simultaneously, in which case the stroke of each charging piston would be adjusted to deliver the required quantity of liquid material for each mold.

The outer banks of mold sections 100 are removably mounted on mold plates 101, and the mating banks of mold sections 100' are mounted on mold plates 102. The two inner or adjacent mold plates 102 are mounted for rotation on two divergent axes on a radial shaft 103 (Fig. 14), the axis of shaft 103 being the major axis of rotation and the axis of the shaft on which bevel gear 104 is mounted being the minor axis of rotation. The mold units are rotated on these axes between the unloading and charging stations, and means is provided on the turntable casting machine for stopping the molds in horizontal position at the charging station, as set forth in application Serial No. 447,789.

As shown in Fig. 14, suitable mechanism may be provided for opening and closing the mold sections at the charging station. Such mechanism may include a platform 105 positioned below the lower plate 101 which is raised and lowered by a hydraulic cylinder 106. Platform 105 carries sockets for engaging and turning the mold clamping bolts to separate the mold sections, after which the cylinder 106 is operated to move them farther apart to the position shown in Fig. 14. Duplicate mold opening and closing mechanism is provided above the upper mold plate 101. Such mechanism forms no part of the present invention.

The nozzle plates 97 are supported on upper and lower extensions of a rectangular carriage frame having top and bottom horizontally extending angles 108 and 109, respectively, connected by vertical angles or T-bars 110 and 111, the plates 97 preferably being welded to forward extensions of the angles 108 and 109. At the rear end of the carriage frame the angles 108 and 109 may be connected by transverse angles 112 and 113, respectively, and between the bars 110 and 111 the angles are connected by transverse channels 114A and 114B. These channels carry clamps 115 for mounting the ends of branch conduits 93A and 93B thereon.

Separable hose mounting bars extend transversely between the upper and lower angles 108 and 109 in front of the clamps 115 for securing the several hoses 40 leading to the nozzle heads 97. As shown in Fig. 16 these bars have upper and lower mating parts 116A and 116B, and 117A and 117B, respectively, held together by screws 118 at their ends, each bar having eight spaced holes through which the eight hoses 40 leading to each of the nozzle heads are positioned.

On opposite sides of the carriage frame are mounting plates 120 secured as by welding to the bars 110 and 111, and upper front rollers 121 and lower rear rollers 122 are journaled on stub shafts carried on the mounting plates. The upper rollers 121 roll on upper cam tracks 123 secured on the inner surfaces of side plates 124 on the vertical legs 96 of the framework in which the carriage is mounted. The lower rear rollers 122 roll on lower cam tracks 125 on said plates 124. The side plates 124 are secured along their top edges to horizontal angles 126 connecting the tops of channel legs 96. The lower ends of the legs 96 may be connected by transverse channels 127, and V-shaped rollers 128 are preferably mounted at the bases of the legs 96 to support the framework on triangular track bars 129. This enables locating the framework in proper relation to the turntable on which the molds are mounted. Any suitable locking means may be provided for holding the framework in adjusted position.

The cam tracks 123 and 125 are provided with closed front end portions 123' and 125', respectively, so that as the nozzle head carriage is moved forwardly on the tracks, the two nozzle plates 97 first move horizontally in planes well above the lower mold sections of each bank of molds and then move angularly downward to the position shown in Fig. 14, where the tips of the nozzles 98 are closely adjacent to the mold cavities which they are to fill. This track arrangement permits the nozzles to clear dowel pins and other obstructions projecting upwardly from the lower mold sections of each bank.

The means for extending and retracting the nozzle carriage, between the positions of Figs. 13 and 14, preferably includes a fluid cylinder 130 hinged at its lower end on a bracket 131 attached to the front transverse channel 127 midway of the legs 96. The piston has fluid connections 132 and 133 at its ends, and the piston rod 134 thereof is pivotally connected at its outer end to a clevis 135 on the rear end of the carriage frame.

Each nozzle 98 is preferably provided with improved means for preventing dripping of the liquid plastisol after the required amount has been deposited in the mold cavity beneath. The improved drip preventing means is the subject of my co-pending application Serial No. 281,337, filed April 9, 1952. For the purpose of this application the improved drip preventing means may be briefly described as including a conical shut-off valve seating on the annular bottom of a perforate supplemental nozzle which seats on the inner edge of the main nozzle. The shut-off valve and both nozzles are normally held in seating relation by spring pressure.

When the liquid plastisol is forced into the nozzle by the charging piston 41 connected thereto, the shut-off valve opens the supplemental nozzle to discharge liquid, the supplemental nozzle remaining in closed relation with the main nozzle. When the piston 41 starts on its upstroke, creating a partial vacuum in the line, the shut-off valve closes the supplemental nozzle and is moved with the supplemental nozzle, by suction, within the main nozzle, to catch and hold any drops of plastisol and prevent dripping. When the piston 41 reaches the top of its stroke, atmospheric pressure is restored and the springs return the nozzle parts to normal seating position.

In the operation of the improved charging mechanism, when a mold unit on the turntable casting machine is stopped at the charging station, with the banks of molds in horizontal position and the molds properly oriented around their vertical axes, the mold opening mechanism is operated, preferably automatically by suitable electric switching devices to move the mold sections apart. The fluid cylinder 130 is then operated to move the nozzle head carriage forwardly and position the nozzles 98 over the respective mold cavities in each of the lower mold sections.

The valve controlling fluid flow to cylinder 56 through line 68 is then opened, manually or automatically by means of a suitable limit switch, and the cylinder 56 and plate 70 move downwardly. As the plate 70 moves down it abuts the nut units 77 at their adjusted levels and operates the piston 41 to deliver measured charges of plastisol to the various nozzles 98, the nut units having been previously adjusted to deliver the correct amounts of plastisol for the different mold cavities. When the plate 70 reaches its lowest level, bolt 90 actuates switch 92, reversing the travel of plate 70 to upward. The upward movement of the pistons 41 creates a partial vacuum in cylinders 36 preventing drip at the nozzles in the manner previously set forth.

After the plate 70 reaches its top position, the nozzle carriage is retracted to the position of Fig. 13, the mold closing mechanism closes the mold sections, and the turntable casting machine advances the closed molds through a curing zone while rotating the molds on two divergent axes.

What is claimed is:

1. A device for charging liquid material into a mold having a plurality of matrices, including a charging reservoir containing said liquid material, a plurality of individual charging cylinders for the respective matrices communicating with said reservoir, a movable piston in each cylinder, conduits for conducting liquid material from said cylinders to the respective matrices, a reciprocating plate for operating said pistons, and individual adjustable lost motion means for transmitting the downstroke of said plate to the several pistons whereby the stroke of each piston may be varied.

2. A device for charging liquid material into a mold having a plurality of matrices, including a charging reservoir containing said liquid material, a closed gravity supply tank for said reservoir, a conduit connecting the air space above the liquid in said tank to the liquid level in the reservoir for maintaining the liquid level in said reservoir substantially constant, a plurality of individual charging cylinders for the respective matrices communicating with said reservoir, a movable piston in each cylinder, conduits for conducting liquid material from said cylinders to the respective matrices, a reciprocating plate for operating said pistons, and individual adjustable lost motion means for transmitting the downstroke of said plate to the several pistons whereby the stroke of each piston may be varied.

3. A device for charging liquid material into a mold having a plurality of matrices, including a charging reservoir containing said liquid material, a closed gravity supply tank for said reservoir, a conduit connecting the air space above the liquid in said tank to the liquid level in the reservoir for maintaining the liquid level in said reservoir substantially constant, a plurality of individual charging cylinders for the respective matrices communicating with said reservoir, a movable piston in each cylinder having a piston rod extending axially therefrom, conduits for conducting liquid material from said cylinders to the respective matrices, a reciprocating plate fitting slidably over said piston rods, stop nuts on said rods above said plate for abutting the plate on its upstroke to raise the pistons, and a nut unit adjustable on each rod below said plate providing a lost motion means for transmitting the downstroke of the plate to the several pistons whereby the strokes of the pistons may be varied.

4. A device for charging liquid material into a mold having a plurality of matrices, including a charging reservoir containing said liquid material, a closed gravity supply tank for said reservoir, a conduit connecting the air space above the liquid in said tank to the liquid level in the reservoir for maintaining the liquid level in said reservoir substantially constant, a plurality of individual charging cylinders for the respective matrices communicating with said reservoir, a movable piston in each cylinder having a piston rod extending axially therefrom, conduits for conducting liquid material from said cylinders to the respective matrices, a reciprocating plate fitting slidably over said piston rods, stop nuts on said rods above said plate for abutting the plate on its upstroke to raise the pistons, a nut unit adjustable on each rod below said plate providing a lost motion means for transmitting the downstroke of the plate to the several pistons whereby the strokes of the pistons may be varied, said nut units including a nut member screwed on the rod, a ratchet member abutting said nut member axially movable on the rod, and means yieldingly resisting relative rotation between said members.

5. A device for charging liquid material into a mold having a plurality of matrices, including a charging reservoir containing said liquid material, a closed gravity supply tank for said reservoir, a conduit connecting the air space above the liquid in said tank to the liquid level in the reservoir for maintaining the liquid level in said reservoir substantially constant, a plurality of individual charging cylinders for the respective matrices communicating with said reservoir, a movable piston in each cylinder having a piston rod extending axially therefrom, conduits for conducting liquid material from said cylinders to the respective matrices, a reciprocating plate fitting slidably over said piston rods, stop nuts on said rods above said plate for abutting the plate on its upstroke to raise the pistons, a nut unit adjustable on each rod below said plate providing a lost motion means for transmitting the downstroke of the plate to the several pistons whereby the strokes of the pistons may be varied, said nut units including a nut member screwed on the rod, a ratchet member abutting said nut member axially movable on the rod, means detachably and rotatably connecting said members, and means yieldingly resisting relative rotation between said members.

6. A device for charging liquid material into a mold having a plurality of matrices, including a charging reservoir containing said liquid material, a closed gravity supply tank for said reservoir, a conduit connecting the air space above the liquid in said tank to the liquid level in the reservoir for maintaining the liquid level in said reservoir substantially constant, a plurality of individual charging cylinders for the respective matrices communicating with said reservoir, a movable piston in each cylinder having a piston rod extending axially therefrom, conduits for conducting liquid material from said cylinders to the respective matrices, a reciprocating plate fitting slidably over said piston rods, stop nuts on said rods above said plate for abutting the plate on its upstroke to raise the pistons, a nut unit adjustable on each rod below said plate providing a lost motion means for transmitting the downstroke of the plate to the several pistons whereby the strokes of the pistons may be varied, said nut units including a nut member screwed on the rod, a ratchet member abutting said nut member axially movable on the rod, means detachably and rotatably connecting said members, a circular series of indentations on one of said members, and a spring pressed ball on the other member selectively engaging said indentations for yieldingly resisting relative rotation between said members.

7. A device for charging liquid material into a mold having a plurality of matrices, including a charging reservoir containing said liquid material and having a bottom wall, a plurality of individual charging cylinders for the respective matrices set in said bottom wall and having a lower closed ended cylinder portion depending from the bottom wall and an upper open ended cylinder portion extending above the bottom wall, a piston movable in each of said cylinders, a conduit for conducting liquid through the closed end of each cylinder to each mold matrix, lateral ports in the upper cylinder portion at the level of the bottom wall, a reciprocating plate for operating all of said pistons, and individual lost motion means for transmitting the downstroke of said plate to the several pistons whereby the stroke of each piston may be varied.

8. A device for charging liquid material into a mold having a plurality of matrices, including a charging reservoir containing said liquid material and having a bottom wall, a plurality of individual charging cylinders for the respective matrices set in said bottom wall and having a lower closed ended cylinder portion depending from the bottom wall and an upper open ended cylinder portion extending above the bottom wall, a piston movable in each of said cylinders, a conduit for conducting liquid through the closed end of each cylinder to each mold matrix, lateral ports in the upper cylinder portion at the level of the bottom wall, an internal check valve in each piston permitting fluid flow downwardly therethrough during the suction stroke of the piston and preventing fluid upwardly therethrough during its downstroke, a reciprocating plate for operating all of said pistons, and individual lost motion means for transmitting the downstroke of said plate to the several pistons whereby the stroke of each piston may be varied.

9. A device for charging liquid material into a mold having a plurality of matrices, including a charging reservoir containing said liquid material and having a bottom wall, a plurality of individual charging cylinders connected to the individual matrices and located in said bottom wall, said cylinders having open upper ends extending into said reservoir, lateral ports in said upper ends at the level of said bottom wall, pistons in said cylinders having piston rods extending upwardly therefrom, an operating plate mounted on said piston rods, means for reciprocating said plate, stop nuts on the rods above said plate for abutting the plate on its upstroke to raise the pistons, and nut units adjustable on the rods below said plate providing a lost motion means for transmitting the downstroke of the plate to the several pistons whereby the strokes of the pistons may be independently varied.

References Cited in the file of this patent

UNITED STATES PATENTS

| | | |
|---|---|---|
| 509,647 | Beardsley et al. | Nov. 28, 1893 |
| 597,884 | Kirkwood | Jan. 25, 1898 |
| 751,555 | Prescott | Feb. 9, 1904 |
| 1,111,736 | Conkling | Sept. 29, 1914 |
| 1,137,128 | Geyer | Apr. 27, 1915 |
| 1,279,161 | Rogers | Sept. 17, 1918 |
| 2,353,341 | Klonaris | July 11, 1944 |
| 2,658,648 | Tribbitt | Nov. 10, 1953 |
| 2,709,538 | Harrington | May 31, 1955 |